United States Patent

[11] 3,616,870

[72] Inventor Dieter Kramer
 Egmating, Germany
[21] Appl. No. 21,145
[22] Filed Mar. 19, 1970
[45] Patented Nov. 2, 1971
[73] Assignee Zundapp-Werke Gesellschaft mit beschrankter Haftung
 Munich, Germany
[32] Priority Apr. 24, 1969
[33] Germany
[31] P 19 20 750.2

[54] SUSPENSION ARRANGEMENT FOR TWO-WHEELED MOTOR VEHICLE
 2 Claims, 3 Drawing Figs.
[52] U.S. Cl. .................................................... 180/32,
 180/33 A, 267/63 R
[51] Int. Cl. ...................................................... B60k 5/12
[50] Field of Search ........................................... 180/33 R,
 33 A, 64, 32; 280/284; 267/63

[56] References Cited
UNITED STATES PATENTS
3,542,146 11/1970 Hooper et al. ................. 180/33
FOREIGN PATENTS
1,189,881 3/1965 Germany ....................... 180/33

*Primary Examiner*—Kenneth H. Betts
*Attorney*—Robert H. Jacob

ABSTRACT: Two-wheeled motor vehicle with a motor and transmission block suspended at least at two different points of the vehicle frame, where the suspension at the rear and the points of connection of the swinging arm of the rear wheel are disposed at a common pivot axis and where a bearing pin extends through two axially spaced bearing sockets and the rearward suspension for the motor and transmission block is arranged centrally of the pin between the two sockets to the two sides of which the linking joints of the swinging arm of the rear wheel is rotatably and elastically journaled and the entire bearing means can be radially and axially stressed or tensioned.

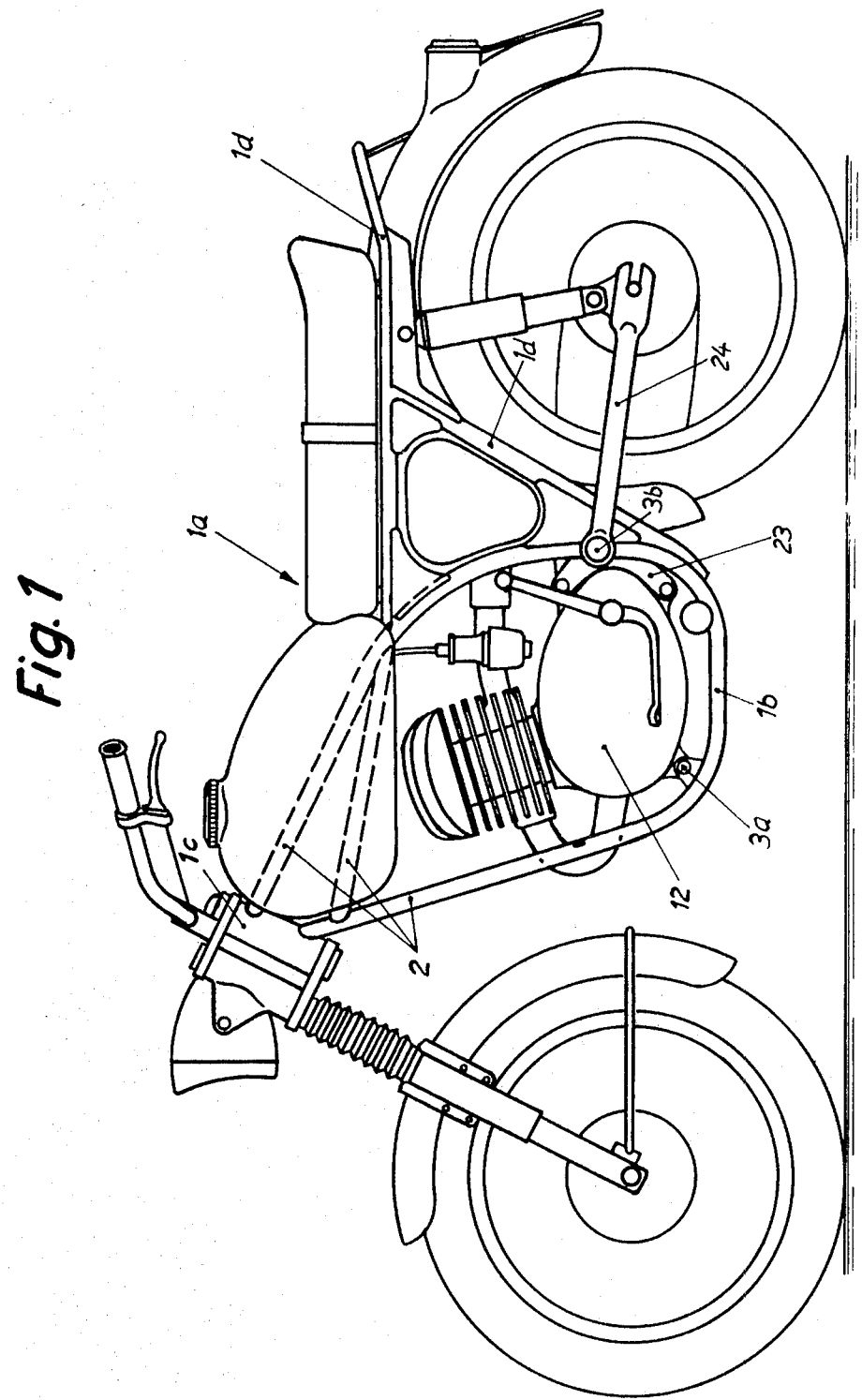

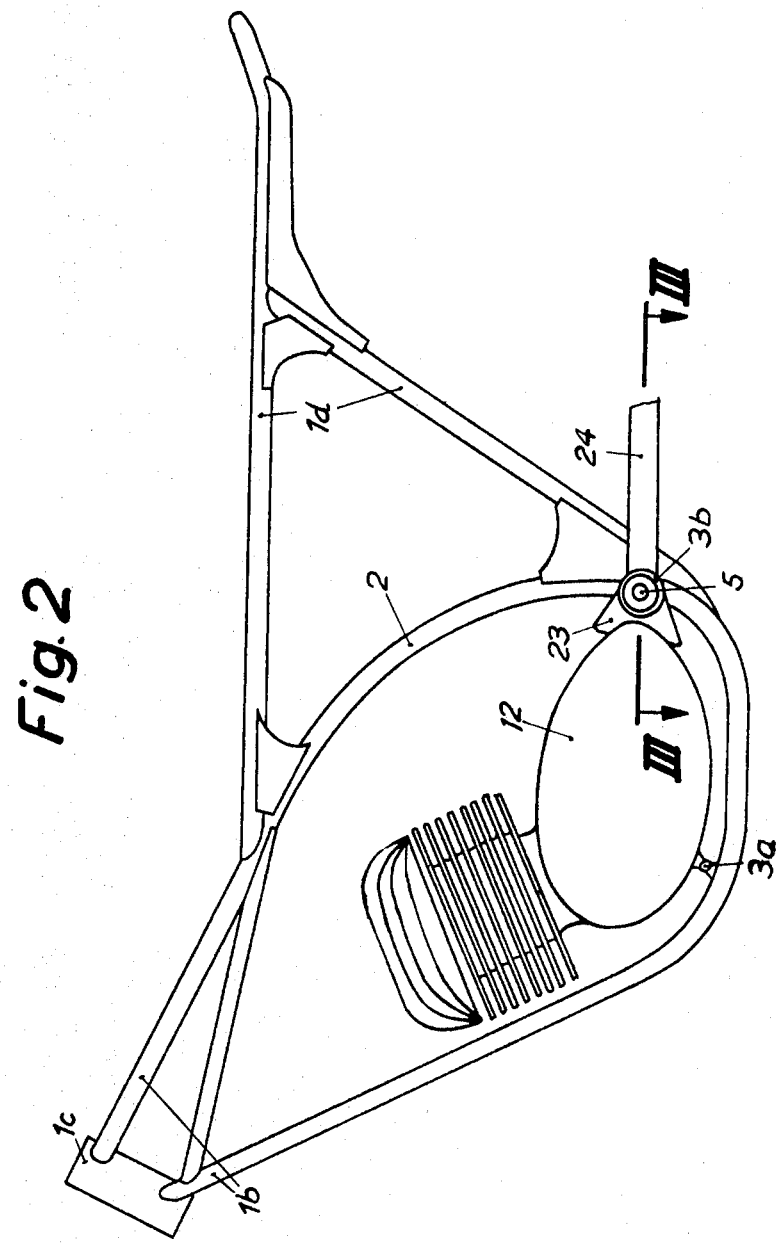

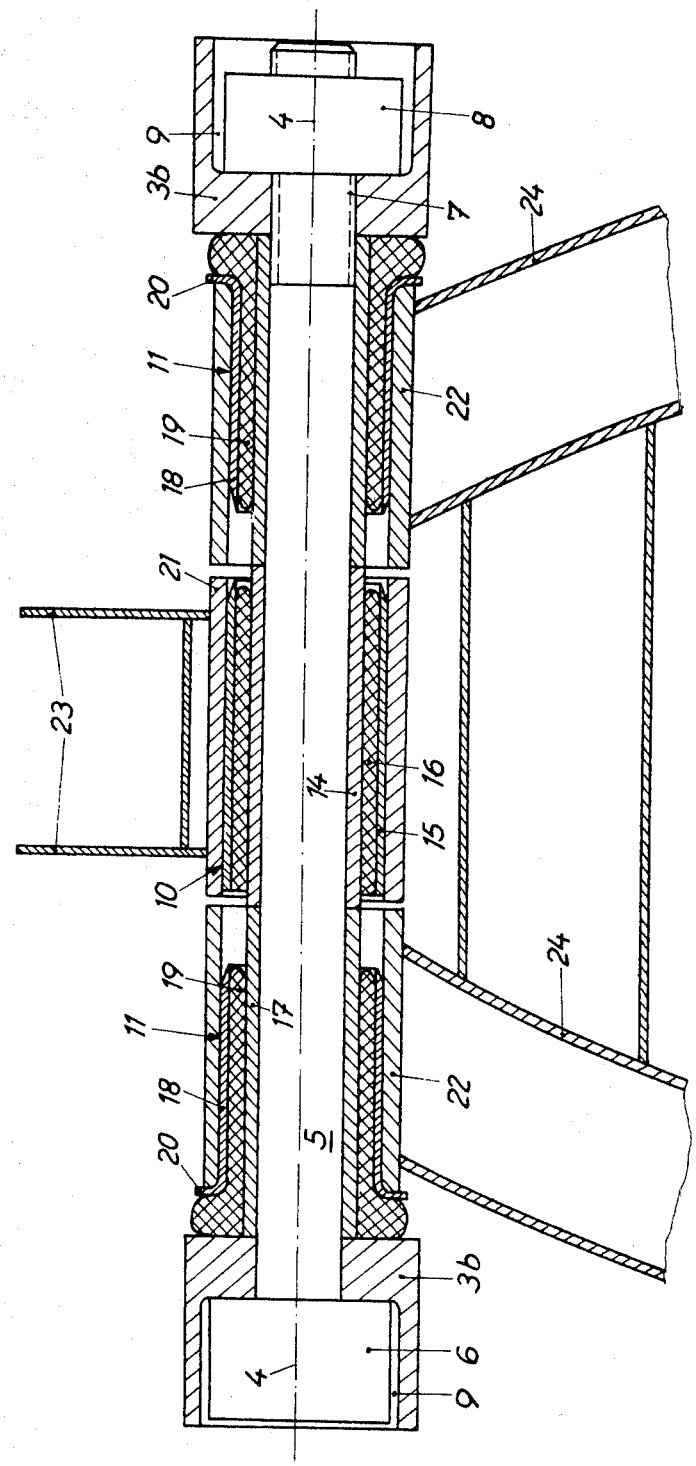

SUSPENSION ARRANGEMENT FOR TWO-WHEELED MOTOR VEHICLE

BACKGROUND OF THE INVENTION

The present invention relates to motor bicycles and is concerned with the type of vehicle where the engine and the transmission unit are suspended in the frame. More in particular, the invention concerns a two-wheeled motor vehicle having a motor and transmission block that is journaled at least at two different points of suspension of the vehicle frame, where the rearward suspension of the motor and transmission block and the connecting points of the rocking arm of the rear wheel are disposed on a common pivot axis.

A two-wheeled motor vehicle is already known, for example from DAS 1,189,881 (German Published Application) where the rearward suspension of the motor and transmission block and the points of connection or linkage of the rocking arm of the rear wheel are arranged on a common axle. There the pivot bearings for the motor and transmission suspension are mounted on the ends of a bearing tube connected centrally of the frame of the vehicle with elastic rubber elements interposed and are retained by threaded nuts screwed onto the ends of the bearing tube. The pivot bearings for linking on the rocking arm for the rear wheel are coaxially connected thereto on both sides at the ends of a sleeve which is passed through the bearing tube. The sleeve, in turn is mounted on a bearing pin having ends provided with threads for receiving threaded nuts whereby the entire bearing arrangement is retained against axial movement.

Such an elastic suspension of the motor and transmission block with the joint for the rear wheel rocking arm on the same axle is expensive to construct and cumbersome to assemble. The pivot bearings for the suspension of the motor and transmission block are each tensioned in axial direction by a threaded nut independently of the connection of the rocking arm of the rear wheel. This requires not only a number of additional individual components, but besides that numerous additional working operations for completing these components, such as cutting the threads at the ends of the bearing tube. These additional operations involve increased expenditure of time and money. Likewise the assembling and dismounting are time consuming and consequently costly, because several nuts must be tightened or loosened in order to retain the pivot bearings and sleeves securely in position or to dismantle them.

It is, therefore, an object of the invention to provide an elastic suspension of the motor and transmission block and a linkage for the rocking arm of the rear wheel for two-wheel motor vehicles while avoiding or eliminating these disadvantages, which is flawless as to function as well as simple and economical to produce and assemble.

In accordance with the invention this is accomplished in that a bearing pin is extended through two bearing sockets arranged laterally at a distance from one another coaxially in the vehicle frame, upon the center portion of which, between the two sockets, the suspension of the motor and transmission block, and on both sides of which the linkage points for the rocking arm of the rear wheel are pivotally and elastically journaled and where the entire journaling can be tensioned axially relative to the head of the pin by a nut threadedly received on one end of the bearing pin. This arrangement provides the advantage that the forces of the driving chain of the two-wheeled motor vehicle which can be a multiple of the force of propulsion are not transmitted to the vehicle frame to be absorbed by it, which would require a considerably stronger frame structure and would adversely affect the weight and the driving qualities of the two-wheeled motor vehicle. The forces of the chain in the arrangement and construction in accordance with the invention rather constitute a closed circuit in which, emanating from the chain they reach the back of the motor suspension by way of the chain pinion and the motor transmission block, and thence transmit by way of the bearing pin and the rocking arms of the rear wheel and rocking support to the rear wheel and thereby again onto the chain proper and are absorbed by the chain. In addition the manufacture, as well as the assembly and dismantling of the suspension of the motor and transmission block elastically constructed in this manner while simultaneously linking on the rocking arm of the rear wheel is simple and saves expenses, because the points of suspension and the linkage points are disposed directly upon the bearing pin between the bearing sockets of the vehicle frame and require no further separate safety devices.

In a further embodiment of the invention the suspension of the motor and transmission block may be provided with a mounting and the rear wheel rocking device may have rocking arms which have bearing orifices at their ends into which elastically formed readymade pivot bearings are inserted that are arranged upon the bearing pin which are not slidable axially or radially. By these means the time and costs for the production and assembly are further reduced, because the pivot bearings can be placed into the bearing orifices for the motor and transmission block suspension and the rear wheel rocking arms as readymade structural components. It is a further advantage of this embodiment that additional fastening means are eliminated, because the bearing orifices which are provided with the inserted pivot bearings for the motor suspension and the rocker connection are merely axially tensioned between the bearing orifices, which is effected by tightening a nut threadedly mounted on the bearing pin.

DESCRIPTION OF THE DRAWINGS

Further details and advantages of the invention will become apparent from the following description of an embodiment of the invention illustrated in the accompanying drawings, in which FIG. 1 is a side view of a two-wheeled vehicle embodying the invention, FIG. 2 is a side view of the frame of a two-wheeled motor vehicle with the suspension of the motor and transmission block and the connection of the rocking arm of the rear wheel, and FIG. 3 shows the suspension of the motor and transmission block and the connection of the rocking arm of the rear wheel in mounted condition in a sectional view taken along lines III—III in FIG. 2.

DESCRIPTION OF THE INVENTION

The two-wheeled motor vehicle 1a illustrated in FIG. 1 has a vehicle frame 1b in the form of a double loop tubular frame. In the forward upper part the frame tubes 2 of the vehicle frame 1b are connected with the steering head tube 1c. The rearward part 1d of the vehicle frame 1b is connected in the upper and lower region to the frame portion that forms the double loop. Within the double loop the motor transmission block 12 is mounted and connected with the vehicle frame 1b at points 3a and 3b. The rearward motor suspension is by means of bearing sockets 3b provided in the tubes 2 of the frame. These bearing sockets 3b are disposed along the same axis 4 in the frame tubes 2 that extend along both sides of the vehicle. A bearing pin 5 extends through the sockets 3b which is provided at one end with a bolt head 6 and at its other end with a thread 7 for mounting a nut 8. The bolt head 6 and the threaded nut 8 are accommodated in outwardly open recesses 9 of the sockets 3b, thereby avoiding lateral projecting of these parts beyond the vehicle frame 1b. Between the two sockets 3b pivot bearings 10, 11 are disposed around the bearing pin 5 where the bearing 10 which is centrally disposed on the pin 5 serves for suspension of the motor-transmission block 12, while the two pivot bearings 11 located at the two end surfaces of the pivot bearing 10 are arranged for linking on the rocking arms 24 for the rear wheel. The pivot bearings 10, 11 known under the trade marks Silentbloc and Flanbloc are in the form of structural elements ready for assembly, which comprise essentially the same components. In lieu of these special bearings it is, of course, possible to use pivot bearings of any other desired form of construction. Thus, pivot bearing 10 comprises an inner sleeve 14 rotatably mounted on the bearing pin 5 and an outer sleeve 15 arranged at a radial distance from said pin 5 which is of shorter length than sleeve 14. An elastic element 16 about equal in length as outer sleeve 15 is pressed in between the two sleeves 14, 15. As a result of the firm connection of the elastic element 16 between the two sleeves 14 and 15, which may, for example, be effected by prestressing, and elastic bearing is obtained which is relatively hard, both in radial and axial direction. Also the pivot bearings 11 comprise an inner sleeve 17, rotatably journaled on the bearing pin 5, an outer sleeve 18 arranged at a radial distance relative thereto and an elastic element 19 firmly mounted between sleeves 17, 18. The outer sleeve 18 is shorter than the inner sleeve 17 and presents flanges 20 at its ends proximate the orifices of the sockets 3b. At the same side the elastic element 19 projects above the inner sleeve 17 and abuts the adjacent ends of the bearing sockets 3b.

The pivot bearings 10, 11 are each mounted in a nonslidable manner with their outer sleeves 15, 18 in bearing orifices 21, 22 of the mounting support 23 for the motor-transmission block 12 and the rocking arms 24 of the rear wheel support 13.

Having now described my invention with reference to the embodiment illustrated in the drawings, what I desire to protect as my invention is set forth in the appended claims.

I claim:

1. In a two-wheeled motor vehicle having a vehicle frame, a rockable rear wheel connection and a motor and transmission block supported on said frame at least at two points including a rear support, said frame supporting a pivot joint common to said rear support and to said rear wheel connection, said pivot joint including a pair of spaced bearing sockets disposed along a common axis and a bearing pin extending into and between said sockets, said rear support of said motor and transmission block being defined intermediate said sockets and centrally of said pin and said wheel connection having support members intermediate said rear support and said sockets, elastic bearing devices being disposed between said pin and said rear support, and elastic bearing means extending between said support members and said pin, and said sockets being axially movable toward said bearing means and said support members.

2. A pivot joint in accordance with claim 1 where said rear wheel connection has two arms each presenting one said support member and said rear support is a cylindrical sleeve, and elastic pivot bearings being disposed in said support members and in said cylindrical sleeve.

* * * * *